US00RE45919E

(19) United States
(12) Reissued Patent
Yanagihara et al.

(10) Patent Number: US RE45,919 E
(45) Date of Reissued Patent: Mar. 8, 2016

(54) CONTROL DEVICE AND METHOD AND POWER SUPPLY DEVICE

(71) Applicant: Sony Corporation, Tokyo (JP)

(72) Inventors: Kazuharu Yanagihara, Fukushima (JP); Akira Sanpei, Fukushima (JP)

(73) Assignee: Sony Corporation, Tokyo (JP)

(21) Appl. No.: 14/595,830

(22) Filed: Jan. 13, 2015

Related U.S. Patent Documents

Reissue of:
(64) Patent No.: 8,847,550
Issued: Sep. 30, 2014
Appl. No.: 13/212,335
Filed: Aug. 18, 2011

(30) Foreign Application Priority Data

Sep. 3, 2010 (JP) ..... 2010-198142

(51) Int. Cl.
*H01M 10/44* (2006.01)
*H02J 7/00* (2006.01)

(52) U.S. Cl.
CPC ..... *H02J 7/0016* (2013.01); *H02J 7/0014* (2013.01)

(58) Field of Classification Search
CPC ..... H02J 7/0014; H02J 7/0016
USPC ..... 320/118, 119, 122, 134, 136
See application file for complete search history.

(56) References Cited

U.S. PATENT DOCUMENTS 7,528,578 B2 * 5/2009 Tamai ..... H02J 7/0019 320/118
7,554,291 B2 * 6/2009 Yoshida ..... H02J 7/0016 320/116
7,602,145 B2 * 10/2009 Renda ..... 320/119
2006/0119319 A1 * 6/2006 Sakurai et al. ..... 320/116
2010/0019725 A1 1/2010 Nakatsuji
2011/0068744 A1 * 3/2011 Zhu ..... 320/116
2011/0121645 A1 * 5/2011 Zhang et al. ..... 307/9.1

FOREIGN PATENT DOCUMENTS

JP 2002-58170 2/2002
JP 2003-153460 5/2003
JP 2003-284253 10/2003
JP 2005-176520 6/2005
JP 2007-018868 1/2007
JP 2010-032261 2/2010

(Continued)

OTHER PUBLICATIONS

Japanese Office Action issued Dec. 16, 2014, for corresponding Japanese Appln. No. 2010-198142.

(Continued)

*Primary Examiner* — Linh M Nguyen
(74) *Attorney, Agent, or Firm* — K&L Gates LLP

(57) ABSTRACT

A control device includes a controller causing a plurality of cell blocks each configured of one or plurality of secondary battery cells and connected in series to be charged with a cell balance, and the controller includes a detector detecting a voltage of each of the cell blocks, an updater sequentially updating a maximum voltage of the detected voltage of each of the cell blocks, and a discharger discharging a cell block among the plurality of cell blocks, the cell block with a voltage range between the detected voltage and the updated maximum voltage within a discharge target voltage range defined in advance.

19 Claims, 7 Drawing Sheets

(56) References Cited

FOREIGN PATENT DOCUMENTS

| | | |
|---|---|---|
| JP | 2010-098824 | 4/2010 |
| WO | 2008/010896 | 1/2008 |
| WO | 2008/072650 | 6/2008 |
| WO | 2010/010662 | 1/2010 |

OTHER PUBLICATIONS

Chinese Office Action issued Sep. 3, 2014, for corresponding Chinese Appln. No. 2011102498183.

Japanese Office Action issued Jun. 10, 2014, for corresponding Japanese Appln. No. 2010-198142.

Extended European Search Report issued Oct. 5, 2015, for corresponding European Appln. No. 11006621.4 (5 pages).

Japanese Patent Office, Grounds for refusal notice issued in connection with Japanese Patent Application No. 2010-198142, dated Jun. 10, 2014. (3 pages).

* cited by examiner

CONTROL DEVICE AND METHOD AND POWER SUPPLY DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCES TO RELATED APPLICATIONS

The present application claims priority to Japanese Priority Patent Application JP 2010-198142 filed in the Japan Patent Office on Sep. 3, 2010, the entire contents of which are hereby incorporated by reference.

BACKGROUND

The present application relates to a control device and method and a power supply device and, in particular, to a control device and method and a power supply device capable of reducing a charging time.

In related art, in a charging method of charging a plurality of cell blocks connected in series, the voltage of each cell block is detected, and a cell block with a voltage equal to or larger than a specified voltage is discharged, thereby charging the plurality of cell blocks with a cell balance.

In such control referred to as cell balance control, it is desired to equalize the voltages of all cell blocks and balance them in an ideal state for charging.

A related-art method of cell balance control is to continue charging for a predetermined time when the voltage of a cell block becomes equal to or larger than a predetermined voltage, and then discharge only the relevant cell block (for example, refer to Japanese Unexamined Patent Application Publication No. 2005-176520).

Another method is to stop the charging of the entire system when the voltage of a cell block exceeds a predetermined voltage and start the discharging of the relevant cell block (for example, refer to Japanese Unexamined Patent Application Publication No. 2002-58170).

SUMMARY

In the method disclosed in Japanese Unexamined Patent Application Publication No. 2005-176520, since each cell block is independently controlled, the voltage of a discharge target cell block and the voltage of a charge target cell block may become equal to each other during cell balance control, but this situation is neglected and discharging and charging continue. Here, even if continuous charging is stopped for a predetermined period when the voltage becomes equal to or larger than a predetermined voltage, the control becomes such as depicted in FIG. 7 (in the method disclosed in Japanese Unexamined Patent Application Publication No. 2005-176520, the control is further prolonged than in FIG. 7). That is, even though there is a moment when a cell balance can be made, the control does not actively make a cell balance. As a result, it takes some time to make a balance in voltage of each cell block.

Moreover, the method disclosed in Japanese Unexamined Patent Application Publication No. 2002-58170 adopts a technique in which discharging of the relevant cell block is started after charging of the entire system is stopped. Therefore, this technique is different from a technique in which only the relevant block is discharged while charging of the system is being continued.

It is desirable to be able to reduce a charging time with cell balance control when a plurality of cell blocks connected in series are charged.

A control device according to an embodiment includes a controller causing a plurality of cell blocks each configured of one or plurality of secondary battery cells and connected in series to be charged with a cell balance, and the controller includes a detector detecting a voltage of each of the cell blocks, an updater sequentially updating a maximum voltage of the detected voltage of each of the cell blocks, and a discharger discharging a cell block among the plurality of cell blocks, the cell block with a voltage range between the detected voltage and the updated maximum voltage within a discharge target voltage range defined in advance.

The controller performs cell balance control so that a voltage range between a maximum voltage and a minimum voltage of each cell block detected is within a specified voltage range defined in advance.

The discharge target voltage range and the specified voltage range have a relation of the specified voltage range the discharge target voltage range.

The controller stops charging of the plurality of cell blocks when the detected voltage of each cell block becomes equal to or larger than a specified maximum voltage defined in advance.

According to another embodiment, in a control method of a control device including a controller causing a plurality of cell blocks each configured of one or plurality of secondary battery cells and connected in series to be charged with a cell balance, the controller detects a voltage of each of the cell blocks, sequentially updates a maximum voltage of the detected voltage of each of the cell blocks, and discharges a cell block among the plurality of cell blocks, the cell block with a voltage range between the detected voltage and the updated maximum voltage within a discharge target voltage range defined in advance.

In the control device and its control method according to the embodiments, a voltage of each of the cell blocks is detected, a maximum voltage of the detected voltage of each of the cell blocks is sequentially updated, and a cell block with a voltage range between the detected voltage and the updated maximum voltage within a discharge target voltage range defined in advance among the plurality of cell blocks is discharged.

A power supply device according to still another embodiment includes a plurality of cell blocks each configured of one or plurality of secondary battery cells and connected in series, charging means for charging the plurality of cell blocks, and control means for causing the plurality of cell blocks to be charged with a cell balance, and the control means includes detecting means for detecting a voltage of each of the cell blocks, updating means for sequentially updating a maximum voltage of the detected voltage of each of the cell blocks, and discharging means for discharging a cell block among the plurality of cell blocks, the cell block with a voltage range between the detected voltage and the updated maximum voltage within a discharge target voltage range defined in advance.

In the power supply device of the still other embodiment, a voltage of each of the cell blocks is detected, a maximum voltage of the detected voltage of each of the cell blocks is sequentially updated, and a cell block with a voltage range between the detected voltage and the updated maximum voltage within a discharge target voltage range defined in advance among the plurality of cell blocks is discharged.

According to the embodiments, the charging time can be reduced.

Additional features and advantages are described herein, and will be apparent from the following Detailed Description and the figures.

DETAILED DESCRIPTION

Embodiments of the present application will be described below in detail with reference to the drawings.

Example of the Structure of the Power Supply Device

Figure 1:
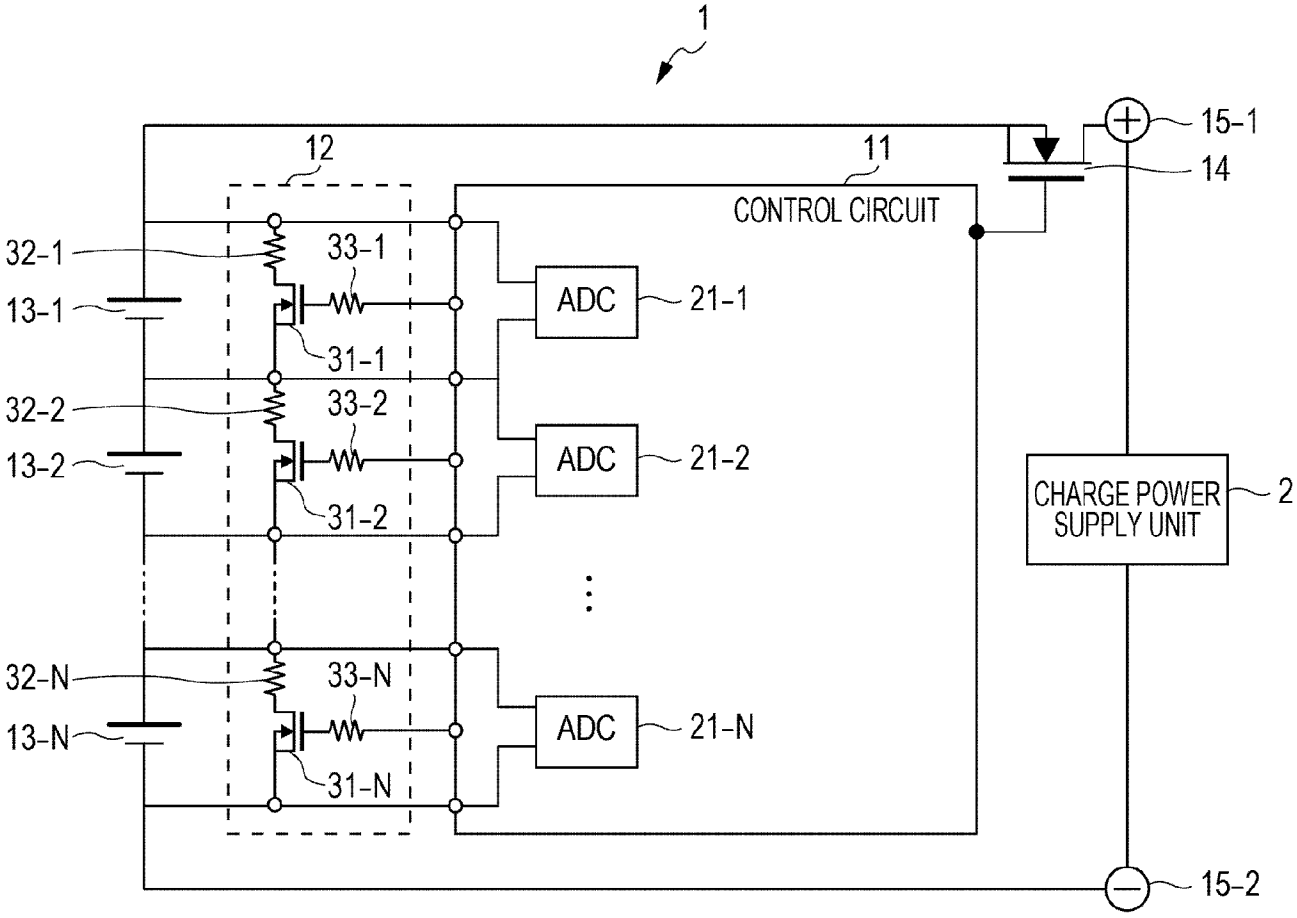
FIG. 1 is a diagram of the structure of a power supply device according to an embodiment.

FIG. 1 is a diagram of the structure of a power supply device according to an embodiment.

A power supply device 1 is, for example, an uninterruptible power supply (UPS). As depicted in FIG. 1, this power supply device 1 includes a control circuit 11, a discharge circuit 12, cell blocks 13-1 to 13-N, and a charge switch 14. Also, the power supply device 1 is removably mounted on a charge power supply unit 2, with a + terminal 15-1 and a – terminal 15-2 electrically in contact with a + terminal and a – terminal of the charge power supply unit 2.

Power from the charge power supply unit 2 is supplied via its terminals to the cell blocks 13-1 to 13-N connected in series. The cell blocks 13-1 to 13-N are charged by the power from the charge power supply unit 2. Note that, in the description below, the cell blocks 13-1 to 13-N are simply referred to as cell blocks 13 when they are not particularly differentiated therebetween.

Each of the cell blocks 13 is configured of a rechargeable secondary battery cell, such as a lithium-ion battery, a nickel metal hydride battery, or a nickel-cadmium battery. That is, the cell block 13 is configured of a set of one or plurality of secondary battery cells connected in series or parallel.

The control circuit 11 causes the cell blocks 13-1 to 13-N connected in series to be charged with a cell balance. The control circuit 11 is provided with ADCs 21-1 to 21-N correspondingly to the cell blocks 13-1 to 13-N. With the ADCs 21-1 to 21-N, the voltages of corresponding ones of the cell blocks 13 are detected. Based on the results of detecting the voltages of the cell blocks 13 by the ADCs 21-1 to 21-N, the control circuit 11 supplies the discharge circuit 12 with a control signal for controlling ON/OFF of switching elements 31-1 to 31-N of the discharge circuit 12.

To the cell blocks 13-1 to 13-N connected in series, discharge circuits (in FIG. 1, discharge circuits respectively corresponding to the cell blocks 13-1 to 13-N are collectively referred to as the discharge circuit 12) are respectively connected in parallel.

For example, a discharge circuit including the switching element 31-1, a discharge resistor 32-1, and a resistor 33-1 is connected to the cell block 13-1 in parallel. In this discharge circuit, the switching element 31-1 and the discharge resistor 32-1 are connected in series, and the switching element 31-1 performs an ON/OFF switching operation in response to a control signal supplied from the control circuit 11 via the resistor 33-1. With this, when the switching element 31-1 is switched from OFF to ON in response to the control signal from the control circuit 11, the voltage of the cell block 13-1 connected thereto is discharged by the discharge resistor 32-1.

Also, each of the discharge circuits connected in parallel to the cell blocks 13-2 to 13-N is configured similarly to the discharge circuit connected in parallel to the cell block 13-1 described above. That is, in response to a control signal from the control circuit 11, the discharge circuit 12 causes the switching elements 31-1 to 31-N to perform a switching operation, thereby causing a corresponding one of the discharge resistors 32-1 to 32-N to discharge a predetermined corresponding cell block 13 among the cell blocks 13-1 to 13-N connected in series.

Also, based on the results of detecting the voltages of the cell blocks 13-1 to 13-N by the ADCs 21-1 to 21-N, when a predetermined cell block 13 among the cell blocks 13-1 to 13-N has a voltage equal to or larger than a predetermined voltage, the control circuit 11 supplies the charge switch 14 with a control signal for turning the charge switch 14 OFF.

In response to the control signal supplied from the control circuit 11, the charge switch 14 performs an ON/OFF switching operation. That is, when the charge switch 14 is turned ON, the power from the charge power supply unit 2 is supplied to the cell blocks 13-1 to 13-N connected in series to charge the cell blocks 13-1 to 13-N. On the other hand, when the charge switch 14 is switched from ON to OFF in response to the control signal from the control circuit 11, supply of the power from the charge power supply unit 2 is stopped, and therefore charging of the cell blocks 13-1 to 13-N is stopped.

As such, the charge switch 14 is controlled by the control circuit 11 to switch between charging and discharging of the cell blocks 13-1 to 13-N. That is, the control circuit 11 and the charge switch 14 function as a charge circuit.

The power supply device 1 is so configured as described above.

Cell Balance Control

Figure 2:
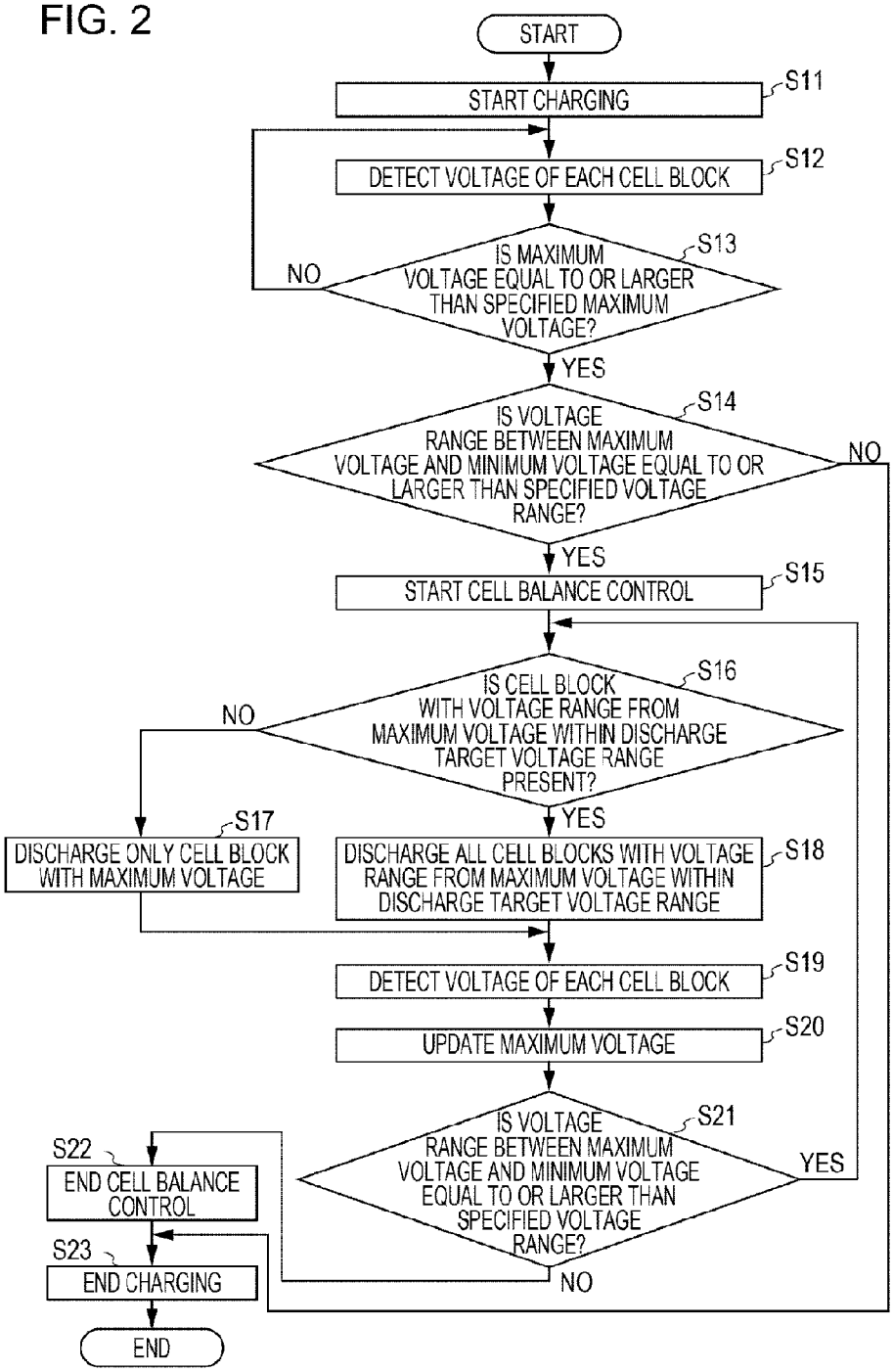
FIG. 2 is a flowchart for describing details of cell balance control.

Next, with reference to a flowchart of FIG. 2, cell balance control to be performed by the control circuit 11 of FIG. 1 is described in detail.

In the power supply device 1, when charging of the cell blocks 13-1 to 13-N starts (step S11), the voltages of the corresponding cell blocks 13-1 to 13-N are detected by the ADCs 21-1 to 21-N in the control circuit 11 (step S12).

At step S13, the control circuit 11 determines whether a maximum voltage of voltages detected by the ADCs 21-1 to 21-N is equal to or larger than a specified maximum voltage.

This specified maximum voltage is set in advance so that the voltage of the cell block 13 does not become equal to or larger than the specified voltage. As an example of the specified maximum voltage, 3.6 V is set. In this case, a cell block 13 with a voltage equal to or larger than 3.6 V is regarded as being at overvoltage.

At step S13, when it is determined that the maximum voltage is smaller than the specified maximum voltage, the procedure returns to step S12, and detection of the voltages of the cell blocks 13-1 to 13-N being charged continues.

With the cell blocks 13-1 to 13-N being charged, when it is determined at step S13 that the maximum voltage of the detected voltages of the cell block 13 is equal to or larger than the specified maximum voltage, the procedure goes to step S14.

At step S14, the control circuit 11 determines whether a voltage range between the maximum voltage and a minimum voltage of the voltages detected by the ADCs 21-1 to 21-N is equal to or larger than a specified voltage range.

This specified voltage range is a voltage range determined by specifications of the product or the like. In cell balance control, control is performed so that the voltage range between the detected maximum voltage and minimum voltage is within the specified voltage range. As an example of the specified voltage range, 30 mV is set.

When it is determined at step S14 that the voltage range between the detected maximum voltage and the minimum voltage is equal to or larger than the specified voltage range, a cell balance has been lost. Therefore, the control circuit 11 starts cell balance control at step S15. Upon starting cell balance control, the control circuit 11 determines whether a cell block 13 with a voltage range between the detected voltage and the maximum voltage within a discharge target voltage range is present among the cell blocks 13-1 to 13-N whose voltages are detected by the ADCs 21-1 to 21-N.

Here, the discharge target voltage range is a voltage range set for taking a cell block 13 with a voltage within a predetermined voltage range from the maximum voltage as a discharge target, where the maximum voltage is set as a reference voltage. As an example of the discharge target voltage range, 20 mV or 30 mV is set. When the maximum voltage is 3.6 V and the discharge target voltage range is 20 mV, cell blocks 13 with a voltage within a range of 3.6 V to 3.58 V (3.6 V-20 mV) are discharged.

When it is determined at step S16 that no cell block 13 with a voltage range from the maximum voltage within the discharge target voltage range is present, the procedure goes to step S17. At step S17, the control circuit 11 causes only the cell block 13 with the maximum voltage to be discharged.

For example, when the cell block 13-1 has a maximum voltage among the cell blocks 13-1 to 13-N, the control circuit 11 supplies the switching element 31-1 with a control signal for turning the switching element 31-1 ON to discharge the cell block 13-1. Then, the switching element 31-1 is turned ON in response to the control signal from the control circuit 11, and power charged in the cell block 13-1 is converted to heat by the discharge resistor 32-1. As a result, the voltage of the cell block 13-1 as the maximum voltage can be reduced.

On the other hand, when it is determined at step S16 that a cell block 13 with a voltage range from the maximum voltage within the discharge target voltage range is present, the procedure goes to step S18. At step S18, the control circuit 11 causes all cell blocks 13 with a voltage range from the maximum voltage within the discharge target voltage range to be discharged.

For example, when the cell blocks 13-2 and 13-3 each have a voltage range from the maximum voltage within the discharge target voltage range among the cell blocks 13-1 to 13-N, the control circuit 11 supplies the switching elements 31-2 and 31-3 with a control signal. Then, the switching elements 31-2 and 31-3 are each turned ON in response to the control signal from the control circuit 11, and the power charged to the cell blocks 13-2 and to 13-3 is converted to heat by the discharge resistors 32-2 and 32-3, respectively. Also, when the cell block 13-1 is at the maximum voltage, the control circuit 11 controls the switching element 31-1 to decrease the voltage of the cell block 13-1.

As a result, not only the voltage of the cell block 13-1 as the maximum voltage can be decreased but also the voltages of the cell blocks 13-2 and 13-3 as voltages close to the maximum voltage, that is, voltages close to overvoltage (for example, voltages in a range of 3.6 V to 3.58 V), can be decreased.

When discharging of the predetermined cell block(s) 13 at step S17 or S18 ends, the procedure goes to step S19, where the voltages of the cell blocks 13-1 to 13-N are detected by the ADCs 21-1 to 21-N, respectively (step S19).

At step S20, the control circuit 11 takes a voltage at maximum as a maximum voltage among the voltages detected by the ADCs 21-1 to 21-N, thereby updating the maximum voltage.

That is, when the predetermined cell block(s) 13 is discharged at step S17 or S18, the maximum voltages of the cell blocks 13-1 to 13-N change, and therefore the maximum voltages are sequentially updated. That is, due to a difference in internal impedance, the cell blocks 13 may not have the same discharge characteristics but generally have slightly different ones. For this reason, the voltage of the cell block 13-1 detected as a maximum voltage at step S12 may not be a maximum voltage, and therefore the maximum voltage is constantly updated during cell balance control (step S20).

The control circuit 11 then determines whether a voltage range between the maximum voltage after update and the minimum voltage is equal to or larger than the specified voltage range (step S21). This specified voltage range has the same value as that of the specified voltage range used in the determination process at step S14, and is set as 30 mV, for example. That is, with the determination process at step S21, it is determined whether a cell balance has been made after discharge at step S17 or S18.

When it is determined at step S21 that a voltage range between the maximum voltage after update and the minimum voltage is equal to or larger than the specified voltage range, a cell balance has still been lost. Therefore, the procedure returns to step S16, and the processes from steps S16 to S21 are repeated. That is, with the processes from steps S16 to S21 repeated, the cell block(s) 13 with the maximum voltage and a voltage close to the maximum voltage are discharged, thereby gradually eliminating the difference between the maximum voltage and the minimum voltage and, with the voltage range therebetween becoming smaller than the specified voltage range, the voltages of cell blocks 13-1 to 13-N are balanced.

Note that when a cell block 13 with a voltage range from the maximum voltage sequentially updated within the discharge target voltage range is newly detected during this cell balance control, the newly detected cell block 13 is also taken as a discharge target, and discharging of this cell block 13 starts.

Then, with the processes from steps S16 to S21 repeated, when it is determined that the voltage range between the maximum voltage after update and the minimum voltage is smaller than the specified voltage range (No at step S21), the procedure goes to step S22. At step S22, the control circuit 11 ends the cell balance control, and the procedure goes to step S23.

Also, when the voltage range between the detected maximum voltage and minimum voltage is smaller than the specified voltage range before cell balance control (No at step S14), the voltages of the cell blocks 13-1 to 13-N are balanced, and the procedure goes to step S23 without performing cell balance control. Then, in the power supply device 1, charging of the cell blocks 13-1 to 13-N ends (step S23).

As such, cell balance control is performed so that, while the maximum voltage of the voltages of the cell blocks 13-1 to 13-N is being sequentially updated by the control circuit 11, a cell block 13 with a voltage range from the maximum voltage as a reference voltage within the discharge target voltage range is discharged.

That is, in stead of individually discharging the plurality of cell blocks 13, discharging of a cell block 13 with a voltage range between the detected voltage and the updated maximum voltage within the discharge target voltage range is sequentially started. As a result, compared with the method of individually starting discharging, the processing time for cell balance control can be reduced, resulting in reduction of the charging time.

Description of Results of Simulations

Next, with reference to FIG. 3 to FIG. 6, specifically how much processing time can be reduced with cell balance control (FIG. 2) according to the embodiment is described by using the results of simulations performed by the applicant.

Note that, in the simulations of FIG. 3 to FIG. 6, simulation conditions are such that eight cell blocks 13-1 to 13-8 are provided and the voltages of these cell blocks 13 at the start of charging are in a range of 3.43 V to 3.5 V set in increments of 0.1 V. Also, as for the internal impedances of the cell blocks 13-1 to 13-8, description is made in the simulations of FIG. 3 and FIG. 4 to the case where the internal impedances are equal to each other in all cell blocks 13, and description is made in the simulations of FIG. 5 and FIG. 6 to the case where the internal impedance are different among all cell blocks 13.

Furthermore, in the simulations of FIG. 3 to FIG. 6, simulation conditions are such that the specified maximum voltage is set at 3.6 V and the specified voltage range is set at 30 mV. Therefore, in each simulation, a cell becomes overvoltage at 3.6 V and, when all voltages of the cell blocks 13-1 to 13-8 are within 30 mV, it is determined that they are balanced and the cell balance control ends. Still further, the discharge target voltage range differs for each of the simulations of FIG. 3 to FIG. 6.

Figure 3:
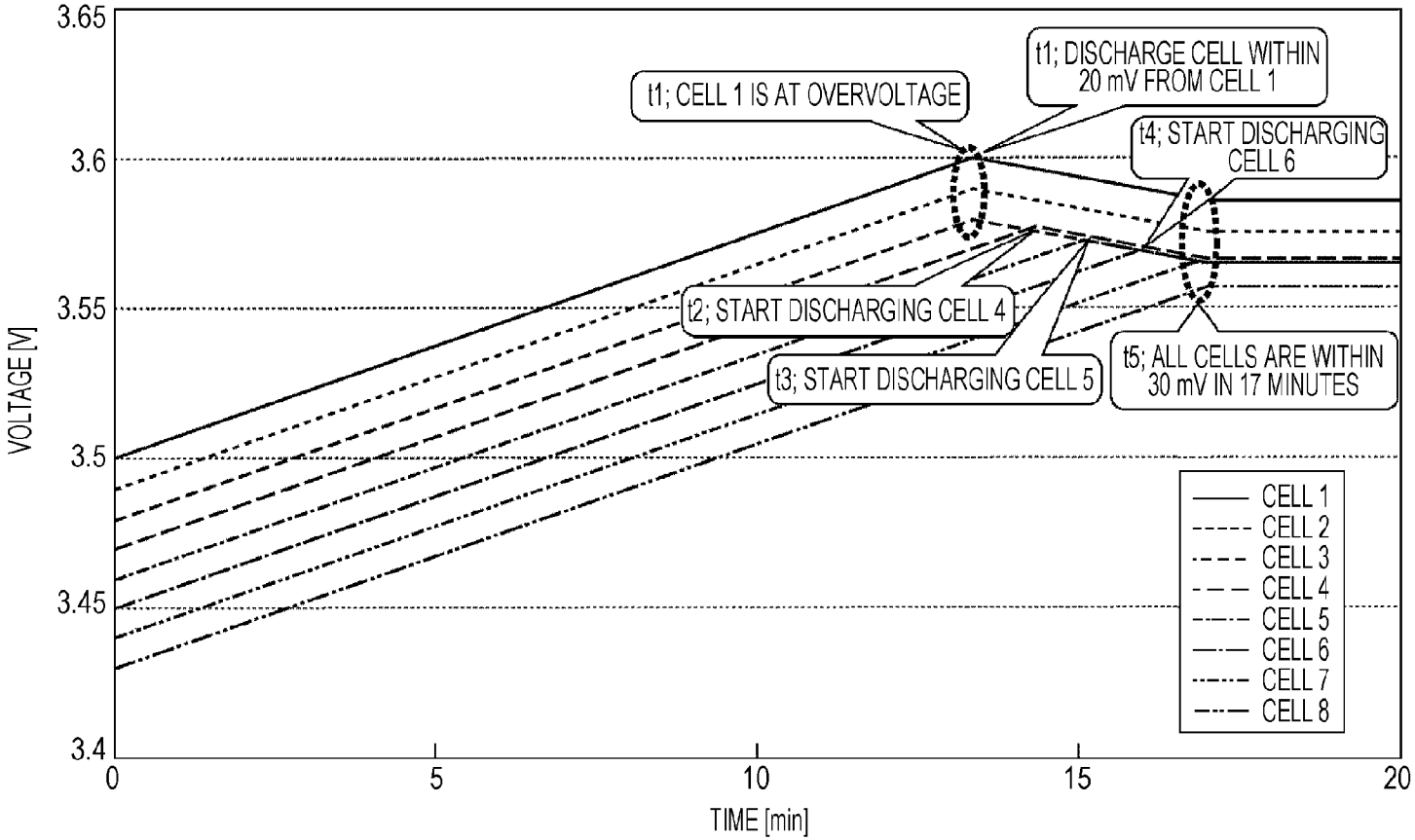
FIG. 3 is a diagram of the result of a first simulation (with a discharge target voltage range of 20 mV and the same impedance)

First, with reference to FIG. 3, the result of a first simulation (with a discharge target voltage range of 20 mV and the same impedance) is described.

Note that, in FIG. 3, the axis in the horizontal direction represents time [min], and it is assumed that time passes in a direction from left to right in the drawing (times t1 to t5 in balloons each represents a time when an operation in the balloon was performed). Also, the axis in the vertical direction represents voltage [V] and, a voltage level increases along the vertical axis upward in the drawing. Note that the relation of these axes is similarly applied to FIG. 4 to FIG. 6, which will be described further below.

As described above, the cell blocks 13-1 to 13-8 (abbreviated as cells 1 to 8 in voltage characteristic graphs in the drawings) each have a voltage at the start of charging set, with the cell block 13-8 at 3.43 V to the cell block 13-1 at 3.5 V in increments of 0.1 V. When the charging starts from this state, since the cell blocks 13-1 to 13-8 has the same impedance, the voltage increases at regular intervals. At the time t1, the voltage of the cell block 13-1 with the highest voltage at the start of charging reaches the specified maximum voltage (3.6 V) to become overvoltage.

With this, discharging of the cell block 13-1 starts. At this time, with cell balance control, the cell blocks 13-2 and 13-3 with a voltage range from the voltage (maximum voltage) of the cell block 13-1 within the discharge target voltage range (20 mV) are also discharged. With this, the voltages of the cell blocks 13-1 to 13-3 peaking at the time t1 are turned to drop.

Then, while the maximum voltage is being updated with cell balance control, a process of newly detecting a cell block 13 with a voltage range from the maximum voltage within the discharge target voltage range (20 mV) continues. At the time t2, the voltage range between the voltage of the cell block 13-4 and the maximum voltage becomes within the discharge target voltage range (20 mV). Thus, discharging of the cell block 13-4 also starts, and its voltage peaking at the time t2 is turned to drop. Similarly, a voltage range from the maximum voltage becomes within the discharge target voltage range (20 mV) in the cell block 13-5 at the time t3 and in the cell block 13-6 at the time t4, and therefore discharging of these cell blocks starts, and the voltages of these cell blocks 13 are turned to drop.

As such, discharging of the cell blocks 13-1 to 13-6 sequentially starts, and when the voltages of the cell blocks 13-7 and 13-8 continue to increase, all voltages of the cell blocks 13-1 to 13-8 are within 30 mV after seventeen minutes (at the time t5) from the start of charging. With this, it is determined that these voltages are balanced, and the cell balance control ends.

Figure 4:
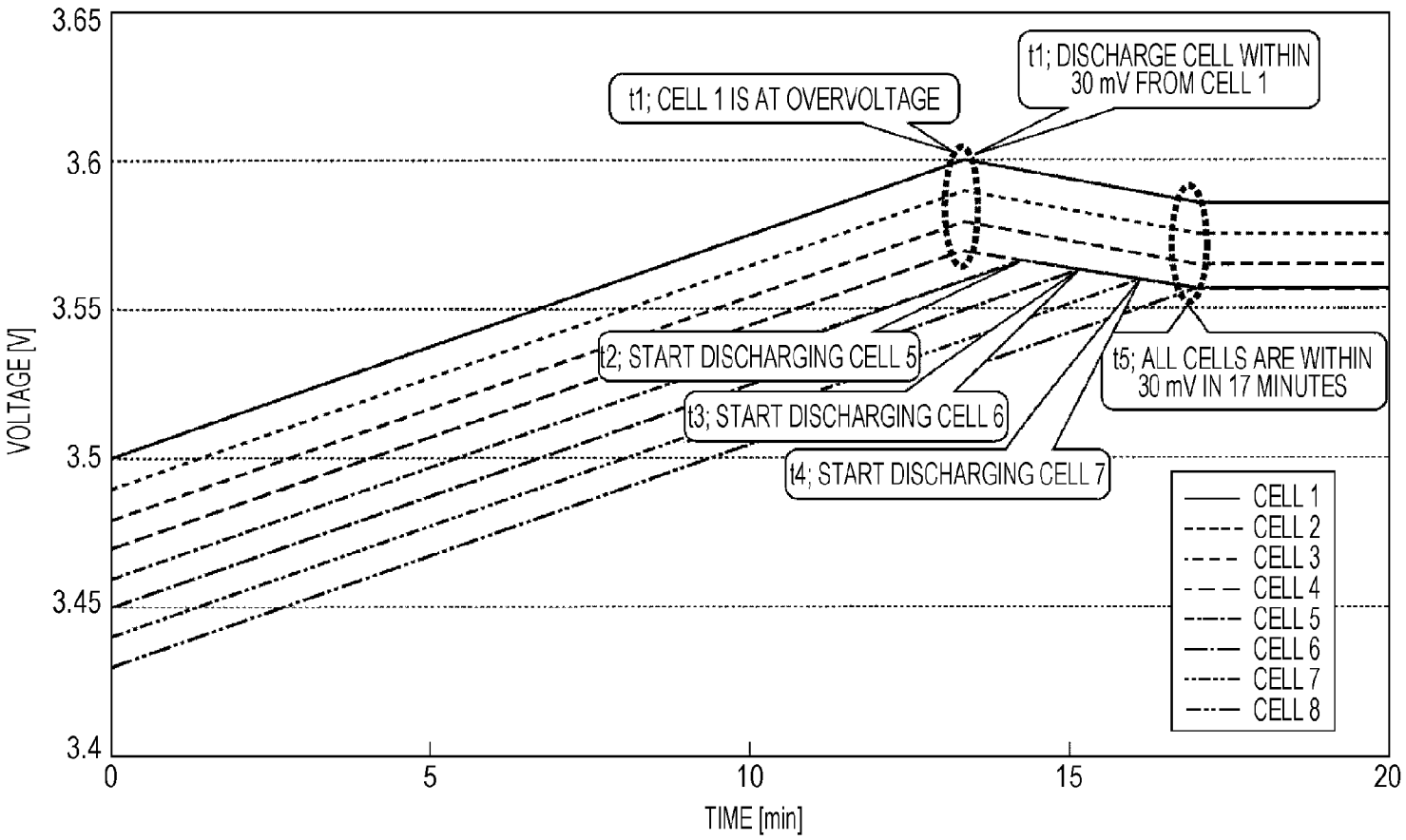
FIG. 4 is a diagram of the result of a second simulation (with a discharge target voltage range of 30 mV and the same impedance)

Next, with reference to FIG. 4, the result of a second simulation (with a discharge target voltage range of 30 mV and the same impedance) is described.

Compared with the result of the first simulation (FIG. 3), while the result of the second simulation is different in that the discharge target voltage range is changed from 20 mV to 30 mV, other conditions are similar to those of the result of the first simulation.

That is, when the voltage of the cell block 13-1 with the highest voltage at the start of charging reaches the specified maximum voltage (3.6 V) at the time t1 to become overvoltage, discharging of the cell blocks 13-2 to 13-4 with a voltage range from the maximum voltage within the discharge target voltage range (30 mV) starts together with discharging of the cell block 13-1. Then, cell balance control continues, and a voltage range from the maximum voltage becomes within the discharge target voltage range (30 mV) in the cell block 13-5 at the time t2, in the cell block 13-6 at the time t3, and in the cell block 13-7 at the time t4, and therefore discharging of these cell blocks starts.

As such, discharging of the cell blocks 13-1 to 13-7 sequentially starts, and when the voltage of the cell block 13-8 continues to increase, all voltages of the cell blocks 13-1 to 13-8 are within 30 mV after seventeen minutes (at the time t5) from the start of charging. With this, it is determined that these voltages are balanced, and the cell balance control ends.

As described above with reference to the results of the simulations of FIG. 3 and FIG. 4, instead of individually discharging the cell blocks 13-1 to 13-8, discharging of a cell block 13 with a voltage range from the maximum voltage within the discharge target voltage range (20 mV of FIG. 3 and 30 mV of FIG. 4) is sequentially started to perform control for actively taking a cell balance. As a result, compared with the method of individually starting discharging, the processing time for cell balance control can be reduced.

That is, in the method of independently controlling each individual cell block, the voltage of a discharge target cell block and the voltage of a charge target cell block may be equal to each other during cell balance control, but this situation is neglected and discharging and charging individually continue. That is, even though there is a moment when a cell balance can be made, the control does not actively make a cell balance. As a result, it takes some time to make a balance in voltage of each cell block. By contrast, as evident from the results of the simulations of FIG. 3 and FIG. 4, discharging of cell blocks 13 with a voltage range from the maximum voltage within the discharge target voltage range (20 mV or 30 mV) sequentially starts to actively make a cell balance. With this, the processing time for cell balance control can be reduced compared with the method of individually starting discharging.

Also, as described with reference to the results of the simulations of FIG. 3 and FIG. 4, when the cell blocks 13-1 to 13-8 have the same impedance, their converging time is not influenced even if the discharge target voltage range is changed. The reason for this is that the converging time until the cell blocks 13-1 to 13-8 have their voltages within the specified voltage range depends on the maximum voltage and the minimum voltage and, as long as the impedance is the same, the cell block 13 with the highest voltage and the cell block 13 with the lowest voltage are not changed, and therefore the converging time is not influenced.

As such, when the cell blocks 13-1 to 13-N have the same internal impedance, compared with the method of individually starting discharging, the processing time for cell balance control can be reduced, and the processing time for cell balance control is not influenced even by a change of the discharge target voltage range.

Figure 5:
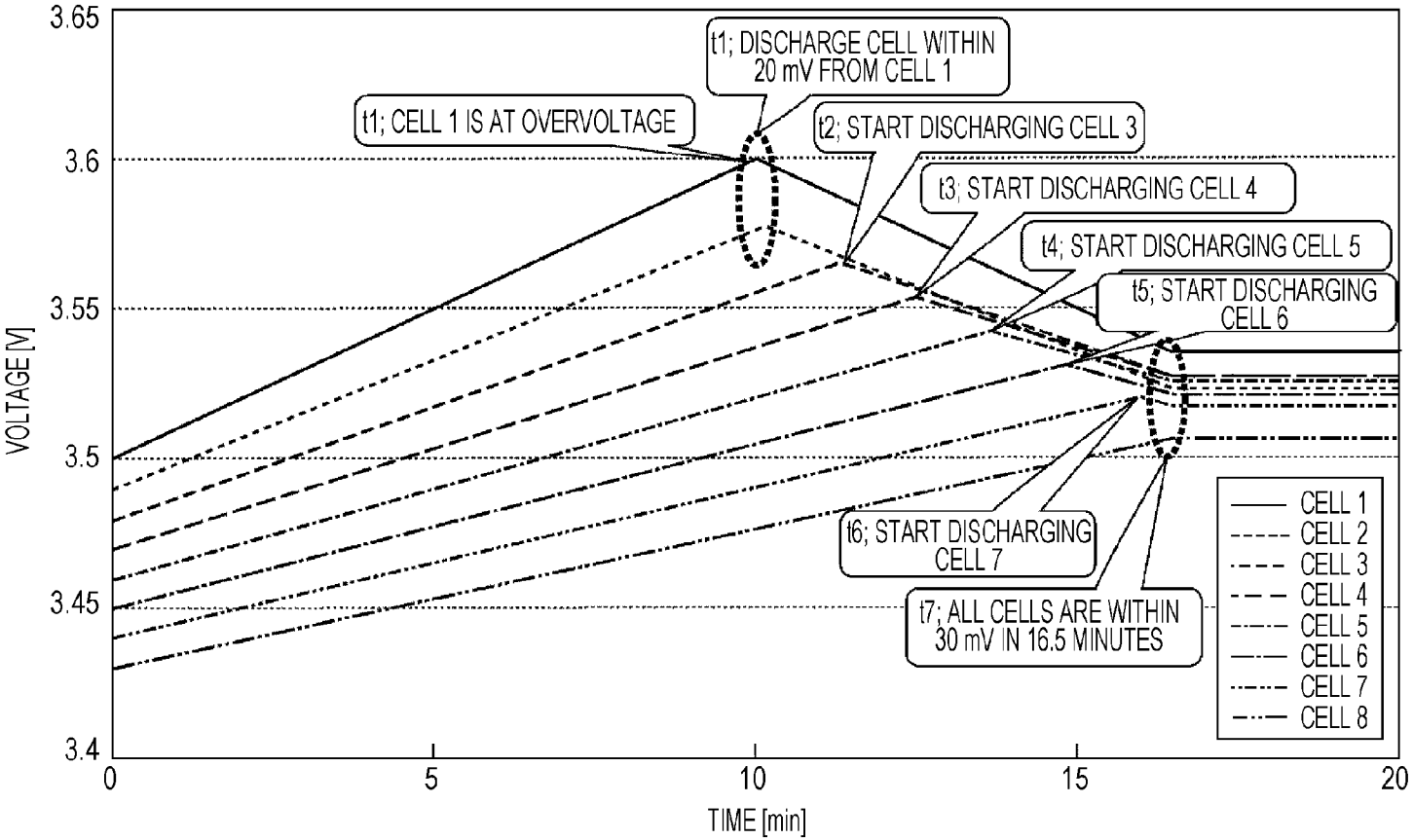
FIG. 5 is a diagram of the result of a third simulation (with a discharge target voltage range of 20 mV and different impedances)

Next, with reference to FIG. 5, the result of a third simulation (with a discharge target voltage range of 20 mV and different impedances) is described.

As described above, since the cell blocks 13-1 to 13-8 have different impedances, increase ranges in voltage are not at regular intervals. At the time t1, the cell block 13-1 having the highest voltage at the start of charging reaches the specified maximum voltage (3.6 V) to become overvoltage. With this, discharging of the cell block 13-1 starts. At this time, with cell balance control, the cell block 13-2 with a voltage range from the voltage of the cell block 13-1 (maximum voltage) within the discharge target voltage range (20 mV) is also discharged. With this, the voltages of the cell blocks 13-1 and 13-2 peaking at the time t1 are turned to drop.

Then, while the maximum voltage is being updated with cell balance control, a process of newly detecting a cell block 13 with a voltage range from the maximum voltage within the discharge target voltage range (20 mV) continues. At the time t2, the voltage range between the voltage of the cell block 13-3 and the maximum voltage becomes within the discharge target voltage range (20 mV). Thus, discharging of the cell block 13-3 also starts, and its voltage is turned to drop. Similarly, a voltage range from the maximum voltage becomes within the discharge target voltage range (20 mV) in the cell block 13-4 at the time t3, in the cell block 13-5 at the time t4, in the cell block 13-6 at the time t5, and in the cell block 13-7 at the time t6, and therefore discharging of these cell blocks starts, and the voltages of these cell blocks 13 are turned to drop.

As such, discharging of the cell blocks 13-1 to 13-7 is sequentially performed, and when the voltage of the cell block 13-8 continues to increase, all voltages of the cell blocks 13-1 to 13-8 are within 30 mV after 16.5 minutes (at the time t7) from the start of charging. With this, it is determined that these voltages are balanced, and the cell balance control ends.

Figure 6:
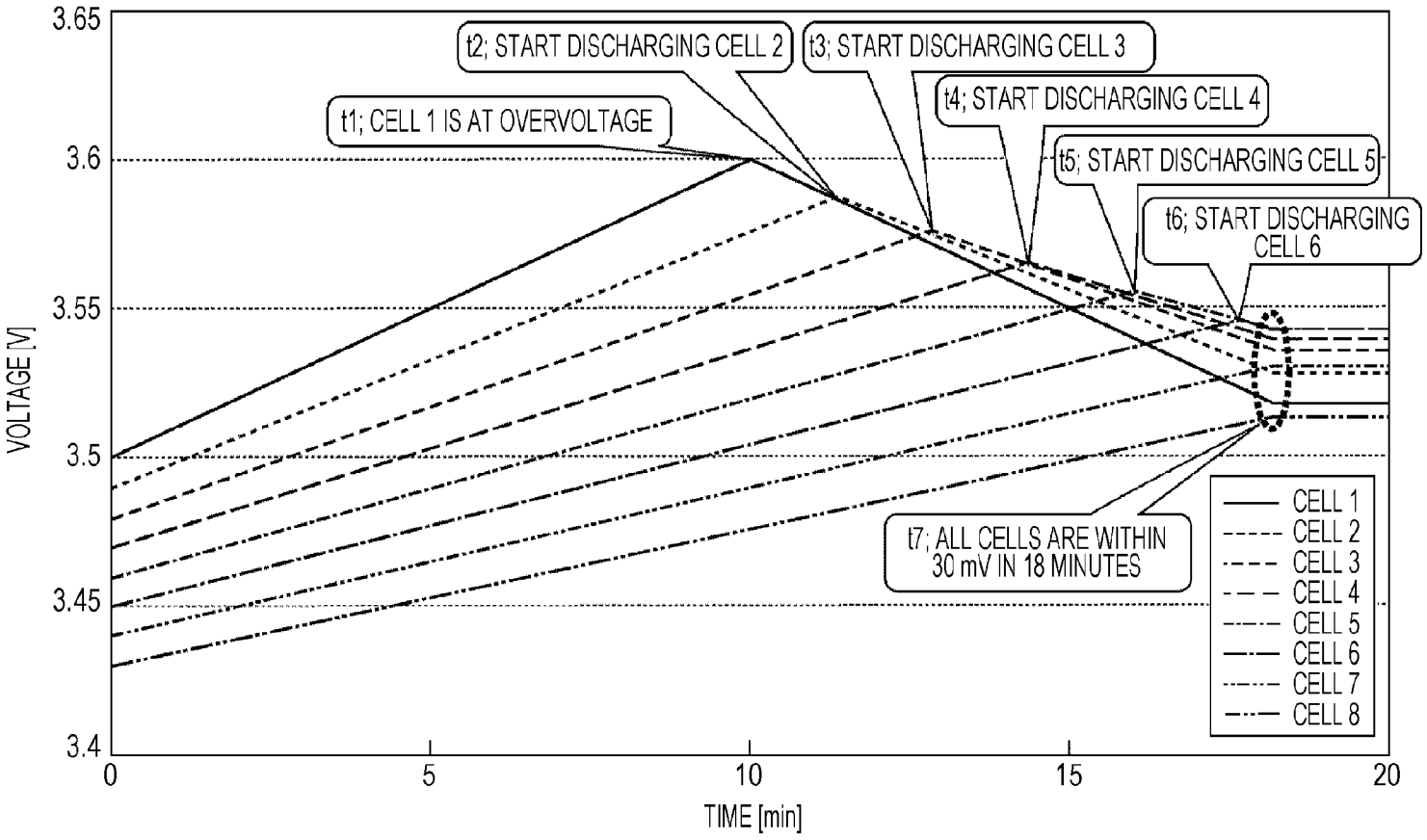
FIG. 6 is a diagram of the result of a fourth simulation (with a discharge target voltage range of 0 mV and different impedances)
Figure 7:
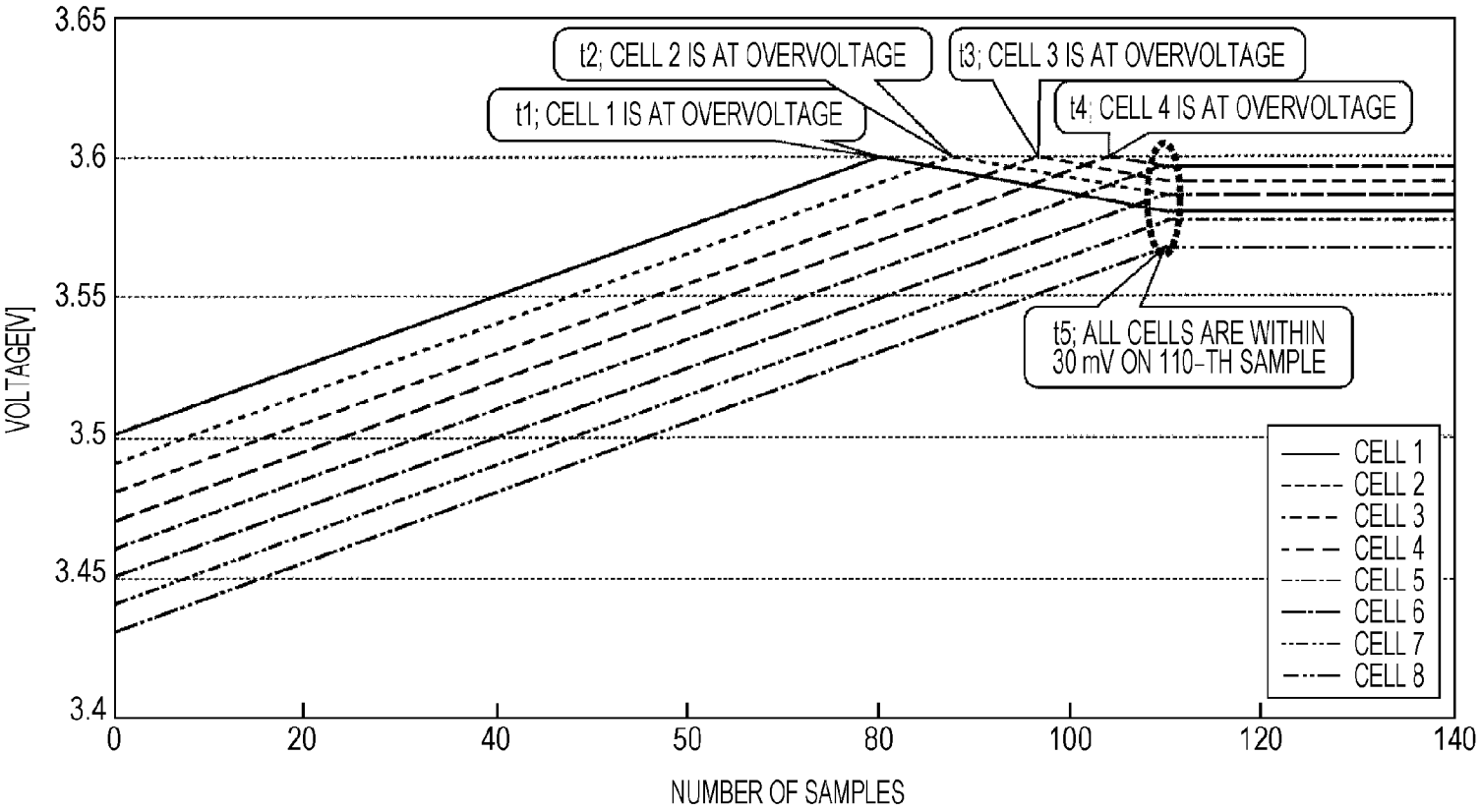
FIG. 7 is a diagram of voltage characteristics with cell balance control in related art.

Next, with reference to FIG. 6, the result of a fourth simulation (with a discharge target voltage range of 0 mV and different impedances) is described.

Compared with the result of the third simulation (FIG. 5), while the result of the fourth simulation is different in that the discharge target voltage range is changed from 20 mV to 0 mV, other conditions are similar to those of the result of the third simulation.

That is, when the voltage of the cell block 13-1 with the highest voltage at the start of charging reaches the specified maximum voltage (3.6 V) at the time t1 to become overvoltage, discharging of the cell block 13-1 starts. At this time, since a cell block 13 with a voltage range from the maximum voltage within the discharge target voltage range (0 mV) (that is, a cell block 13 with the same voltage as the maximum voltage) is not present, only the cell block 13-1 is discharged.

Then, the cell balance control continues. At the time t2 to the time t6, the cell blocks 13-2 to 13-6 have a voltage range from the maximum voltage within the discharge target voltage range (0 mV) (that is, a maximum voltage), and therefore discharging starts.

As such, discharging of the cell blocks 13-1 to 13-6 sequentially starts, and when the voltages of the cell blocks 13-7 and 13-8 continue to increase, all voltages of the cell blocks 13-1 to 13-8 are within 30 mV after eighteenth minutes (at the time t7) from the start of charging. With this, it is determined that these voltages are balanced, and the cell balance control ends.

As described with reference to the results of the simulations of FIG. 5 and FIG. 6, when the cell blocks 13-1 to 13-8 have different impedances, if the discharge target voltage range is changed, their converging time is influenced. That is, in the case of different impedances, the cell block 13 with the maximum voltage constantly changes with a discharge target voltage range of 0 mV (FIG. 6). On the other hand, when the discharge target voltage range is set at a proper value such as 20 mV (FIG. 5), even cell blocks 13 other than the cell block 13 with the highest voltage are discharged, thereby allowing the cell blocks 13 that less tend to be discharged (at a slow discharging speed) to be discharged earlier. Thus, updating of the cell block 13 with the maximum voltage is not performed and, as a result, the processing time is reduced.

As such, when the cell blocks 13-1 to 13-N have different internal impedances, compared with the method of individually starting discharging, the processing time for cell balance control can be reduced and, furthermore, by changing the discharge target voltage range, the processing time for cell balance control can be reduced.

Note that, in practice, it is hardly the case that the impedances of the cell blocks 13-1 to 13-8 are equal to each other and the results of the simulations of FIG. 5 and FIG. 6 may be realistic. Therefore, setting a discharge target voltage range influences reduction in processing time.

However, since the discharge target voltage range (for example, 20 mV or 30 mV) is set lower than or equal to the specified voltage range described above (for example, 30 mV), the discharge target voltage range and the specified voltage range have a relation that can be represented by, for example, Equation (1) below.

$$\text{Specified voltage range} \geq \text{discharge target voltage range} \quad (1)$$

Note that, the larger the discharge target voltage range is, the shorter the converging time in which the voltages of the cell blocks 13-1 to 13-8 converge within the specified voltage range can be. Therefore, in Equation (1), when the discharge target voltage range and the specified voltage range are equal to each other, the processing time for cell balance control can be reduced most.

As described above, in the embodiments, when a cell block 13 with a voltage range from the maximum voltage detected in the plurality of cell blocks 13-1 to 13-N connected in series within the discharge target voltage range is present, that cell block 13 is discharged together with the cell block 13 with the maximum voltage. Then, while the maximum voltage is being sequentially updated, this cell balance control is repeated until the voltage range between the maximum voltage and the minimum voltage is within the specified voltage range. With this, the time for cell balance control can be reduced and, as a result, the charging time can be reduced.

In particular, when the voltages of the cell blocks 13 significantly differ at the start of charging, there is a possibility that it may be difficult to make a cell balance in the method of individually controlling the cell blocks 13. By contrast, in the embodiments, active control is performed so that the voltages of all cell blocks 13 are within the voltage range between the maximum voltage and the minimum voltage. Therefore, accurate cell balance control can be performed.

Also, in cell balance control, when the voltage of the cell block 13 exceeds a predetermined specified maximum voltage (for example, 3.6 V), discharging of not only that cell block 13 but also a cell block(s) 13 within the discharge target voltage range starts simultaneously. Therefore, the cell block 13 close to overvoltage can be discharged in advance. As a result, safe control can be performed without putting a load on the cell blocks 13. Note that, in Japanese Unexamined Patent Application Publication No. 2005-176520, described above, charging is performed for a predetermined period even after the voltage exceeds a predetermined voltage, and therefore there is a possibility of occurrence of dangerous overvoltage depending on the internal impedance of the battery, and thus this control is not safe.

Furthermore, in the embodiments, by defining a voltage range (specified voltage range) between the maximum voltage and the minimum voltage for cell balance determination, the voltages of all cell blocks are within this specified voltage range with cell balance control. With this specified voltage range being variable, the degree of accuracy in cell balance can be freely determined.

Note that, in the embodiments, when a cell block 13 becomes overvoltage at the time of charging, the control circuit 11 may turn the charge switch 14 OFF to stop the power from the charge power supply unit 2, or may keep the charge switch 14 ON not to stop the power from the charge power supply unit 2. That is, the embodiments can be applied to both of a system in which charging stops at the time of overvoltage and a system in which charging continues at the time of overvoltage and discharging of cell blocks is performed, without depending on the system structure of the power supply device.

Note that, in the specification, the steps shown in the flowchart of FIG. 2 include not only processes to be performed on the time series according to the order described herein but also processes to be performed concurrently or individually, even though they may not be processed on the time series.

Also, embodiments are not restricted to the embodiments described above, but can be variously changed within a scope not deviating from the gist.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A control device comprising a controller causing a plurality of cell blocks each configured of one or plurality of secondary battery cells and connected in series to be charged with a cell balance; wherein the controller includes a detector detecting a voltage of each of the cell blocks, an updater sequentially updating a maximum voltage of the detected voltage of each of the cell blocks, and a discharger discharging a cell block among the plurality of cell blocks, the cell block with a voltage range between the detected voltage and the updated maximum voltage within a discharge target voltage range defined in advance.

2. The control device according to claim 1, wherein the controller performs cell balance control so that a voltage range between a maximum voltage and a minimum voltage of each cell block detected is within a specified voltage range defined in advance.

3. The control device according to claim 2, wherein the discharge target voltage range and the specified voltage range have a relation of the specified voltage range≥the discharge target voltage range.

4. The control device according to claim 1, wherein the controller stops charging of the plurality of cell blocks when the detected voltage of each cell block becomes equal to or larger than a specified maximum voltage defined in advance.

5. A control method of a control device including a controller causing a plurality of cell blocks each configured of one or plurality of secondary battery cells and connected in series to be charged with a cell balance; wherein the controller detects a voltage of each of the cell blocks, sequentially updates a maximum voltage of the detected voltage of each of the cell blocks, and discharges a cell block among the plurality of cell blocks, the cell block with a voltage range between the detected voltage and the updated maximum voltage within a discharge target voltage range defined in advance.

6. A power supply device comprising:

a plurality of cell blocks each configured of one or plurality of secondary battery cells and connected in series;

charging means for charging the plurality of cell blocks; and control means for causing the plurality of cell blocks to be charged with a cell balance; wherein the control means includes detecting means for detecting a voltage of each of the cell blocks, updating means for sequentially updating a maximum voltage of the detected voltage of each of the cell blocks, and discharging means for discharging a cell block among the plurality of cell blocks, the cell block with a voltage range between the detected voltage and the updated maximum voltage within a discharge target voltage range defined in advance.

*7. The control device according to claim 1, wherein the discharger includes switching elements and resistors.*

*8. The control device according to claim 1, wherein the discharger includes a plurality of discharge circuits respectively corresponding to the plurality of cell blocks.*

*9. The control device according to claim 8, wherein each one of the plurality of discharge circuits is connected in parallel to a corresponding cell block.*

*10. The control device according to claim 9, wherein each one of the plurality of discharge circuits includes a switching element and a discharge resistor.*

*11. The control device according to claim 10, wherein in response to a control signal from the controller, each one of the plurality of discharge circuits is configured to perform a switching operation.*

*12. The control device according to claim 1, wherein each of the plurality of cell blocks have equal internal impedances.*

*13. The control device according to claim 1, wherein the plurality of cell blocks include cell blocks with different internal impedances.*

*14. The control device according to claim 1, wherein the discharge target voltage range is less than or equal to 20 mV.*

*15. The control device according to claim 3, wherein the discharge target voltage range is equal to the specified voltage range.*

*16. The control device according to claim 1, wherein the controller stops charging of at least one of the plurality of cell blocks when the detected voltage of the at least one of the plurality of cell blocks becomes equal to or larger than a specified maximum voltage defined in advance.*

*17. The control device according to claim 1, wherein the plurality of battery cells includes a lithium-ion battery.*

*18. The control device according to claim 1, wherein the plurality of battery cells includes a nickel metal hydride battery.*

*19. The control device according to claim 1, wherein the plurality of battery cells includes a nickel-cadmium battery.*

* * * * *